United States Patent
Aaron et al.

(10) Patent No.: US 11,845,570 B2
(45) Date of Patent: Dec. 19, 2023

(54) AIRCRAFT SYSTEM OPERATIONAL TESTING

(71) Applicant: THE BOEING COMPANY, Chicago, IL (US)

(72) Inventors: Noah Eric Aaron, Seattle, WA (US); Emily M. Prewett, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 356 days.

(21) Appl. No.: 17/350,491

(22) Filed: Jun. 17, 2021

(65) Prior Publication Data

US 2022/0048648 A1 Feb. 17, 2022

Related U.S. Application Data

(60) Provisional application No. 63/064,201, filed on Aug. 11, 2020.

(51) Int. Cl.
*B64F 5/60* (2017.01)
*B64F 5/40* (2017.01)
(Continued)

(52) U.S. Cl.
CPC .............. *B64F 5/60* (2017.01); *B64F 5/40* (2017.01); *G06F 30/20* (2020.01); *B64D 2045/0085* (2013.01); *G06F 2111/08* (2020.01)

(58) Field of Classification Search
CPC ........ B64D 43/02; B64D 15/20; B64D 43/00; B64D 15/12; B64D 1/18; B64D 1/20;
(Continued)

(56) References Cited

U.S. PATENT DOCUMENTS 9,189,352 B1 * 11/2015 deGaribody, Jr. .... G06F 11/273
2016/0246304 A1    8/2016 Canoy et al.
(Continued)

FOREIGN PATENT DOCUMENTS

EP    2913499 B1    8/2016
EP    2905229 B1    8/2017

OTHER PUBLICATIONS

Extended European Search Report dated Jan. 17, 2022 issued in corresponding EP Application No. 21190445.3, pp. 1-11.
(Continued)

*Primary Examiner* — Andre J Allen
(74) *Attorney, Agent, or Firm* — Moore Intellectual Property Law, PLLC

(57) ABSTRACT

A method includes obtaining a first test matrix for a first aircraft system and a second test matrix for a second aircraft system. The method also includes, during a first operational test of the first test matrix, obtaining sensor data that includes second sensor data that is not specified by the first test matrix. The method includes evaluating a second operational test of the second test matrix by processing the second sensor data using a second analytic model of the second aircraft system. The method also includes generating second predicted sensor data based on the evaluation of the second operational test. The method includes generating a second error measure by comparing a second subset of the sensor data to the second predicted sensor data. The method includes determining, based at least in part on a range of the second sensor data, a test coverage metric of the second test matrix.

20 Claims, 6 Drawing Sheets

(51) Int. Cl.
*G06F 30/20* (2020.01)
*G06F 111/08* (2020.01)
*B64D 45/00* (2006.01)

(58) Field of Classification Search
CPC  B64D 15/16; B64D 15/22; B64D 2033/0286;
B64D 33/02; B64D 45/00; B64D 33/08;
B64F 1/18; B64F 5/60; G06F 30/20;
G01P 13/025; G01P 5/165; G01P 13/02;
G01P 5/14; G01P 5/16; G01P 5/00; G01P
5/02; G01P 5/12; G01P 5/245; G01P
21/025; G01P 5/07; G01P 5/04; G01P
1/02; G01P 1/08; G01P 5/10; G01P 5/06;
G01P 5/18; G01P 5/26; G01P 13/045;
G01P 5/005; G01P 5/08; G01P 21/00;
G01P 3/62; G01P 5/175; G01P 5/24;
G01P 15/00; G01P 15/036; G01P 5/006;
G01P 5/083; G01P 5/086; G01P 5/241;
G01P 7/00; G01P 5/001
USPC ................................................ 73/170.02
See application file for complete search history.

(56) References Cited

U.S. PATENT DOCUMENTS

| | | | |
|---|---|---|---|
| 2020/0327042 A1* | 10/2020 | Ramiro Rebollo | G06F 11/3688 |
| 2022/0024607 A1* | 1/2022 | Leitch | B64F 5/60 |
| 2022/0073211 A1* | 3/2022 | Esser | B64D 45/00 |
| 2022/0205870 A1* | 6/2022 | Howell | G06N 20/00 |
| 2023/0222925 A1* | 7/2023 | Foland | B64C 29/00 701/15 |

OTHER PUBLICATIONS

N.N.: "European Union Aviation Safety Agency Certification Specifications and Acceptable Means of Compliance for Large Rotorcraft" CS-29, Amendment 7, Jul. 15, 2019, pp. 1-225, URL:https://www.easa.europa.eu/downloads/100577/en [retrieved on Dec. 21, 2021] * pp. 2-83-pp. 2-84 *.

* cited by examiner

AIRCRAFT SYSTEM OPERATIONAL TESTING

CROSS-REFERENCE TO RELATED APPLICATIONS

The present application claims the benefit of U.S. Provisional Patent Application No. 63/064,201 entitled "AIRCRAFT SYSTEM OPERATIONAL TESTING," filed Aug. 11, 2020, the contents of which are incorporated by reference in their entirety.

FIELD OF THE DISCLOSURE

The present disclosure is generally related to operational testing of aircraft systems.

BACKGROUND

Operational tests for aircraft systems are generally targeted to individual aircraft systems. As a result, a large number of tests have to be performed for the many aircraft systems included in a typical aircraft. Performing a large number of tests can be costly and time consuming. In addition, if a change is expected to have an effect on a particular system, the operational tests for that particular system are performed and unexpected effects of the change on other aircraft systems can go undetected.

SUMMARY

In a particular implementation, a method of testing includes obtaining, at a device, a first test matrix for a first aircraft system and a second test matrix for a second aircraft system. The method also includes, during a first operational test of the first test matrix, obtaining sensor data that includes first sensor data in a range specified by the first test matrix and second sensor data that is not specified by the first test matrix. The method further includes evaluating, at the device, the first operational test by processing the first sensor data using a first analytic model of the first aircraft system. The method also includes generating, at the device, first predicted sensor data based on the evaluation of the first operational test. The method further includes evaluating, at the device, a second operational test of the second test matrix by processing the second sensor data using a second analytic model of the second aircraft system. The method also includes generating, at the device, second predicted sensor data based on the evaluation of the second operational test. The method further includes generating, at the device, a first error measure by comparing a first subset of the sensor data to the first predicted sensor data. The method also includes generating, at the device, a second error measure by comparing a second subset of the sensor data to the second predicted sensor data. The method further includes determining, based at least in part on a range of the second sensor data, a test coverage metric of the second test matrix. The method further includes providing an output to a display device, the output indicating the first error measure, the second error measure, and the test coverage metric.

In another particular implementation, an aircraft includes aircraft systems, memory, sensors, one or more processors, and a display device. The aircraft systems include a first aircraft system and a second aircraft system. The memory is configured to store a plurality of analytic models of the aircraft systems. The plurality of analytic models includes a first analytic model of the first aircraft system and a second analytic model of the second aircraft system. The sensors are configured to generate sensor data during a first operational test of a first test matrix of the first aircraft system. The sensor data includes first sensor data in a range specified by the first test matrix and second sensor data that is not specified by the first test matrix. The one or more processors are configured to evaluate the first operational test by processing the first sensor data using the first analytic model. The one or more processors are also configured to generate first predicted sensor data based on the evaluation of the first operational test. The one or more processors are further configured to evaluate a second operational test of a second test matrix of the second aircraft system by processing the second sensor data using the second analytic model. The one or more processors are also configured to generate second predicted sensor data based on the evaluation of the second operational test. The one or more processors are further configured to generate a first error measure by comparing a first subset of the sensor data to the first predicted sensor data. The one or more processors are also configured to generate a second error measure by comparing a second subset of the sensor data to the second predicted sensor data. The one or more processors are further configured to determine, based at least in part on a range of the second sensor data, a test coverage metric of the second test matrix. The display device is configured to display an output indicating the first error measure, the second error measure, and the test coverage metric.

In another particular implementation, a computer-readable storage device stores instructions that, when executed by one or more processors, cause the one or more processors to obtain a first test matrix for a first aircraft system and a second test matrix for a second aircraft system. The instructions also cause the one or more processors to, during a first operational test of the first test matrix, obtain sensor data that includes first sensor data in a range specified by the first test matrix and second sensor data that is not specified by the first test matrix. The instructions further cause the one or more processors to evaluate the first operational test by processing the first sensor data using a first analytic model of the first aircraft system. The instructions also cause the one or more processors to generate first predicted sensor data based on the evaluation of the first operational test. The instructions further cause the one or more processors to evaluate a second operational test of the second test matrix by processing the second sensor data using a second analytic model of the second aircraft system. The instructions also cause the one or more processors to generate second predicted sensor data based on the evaluation of the second operational test. The instructions further cause the one or more processors to generate a first error measure by comparing a first subset of the sensor data to the first predicted sensor data. The instructions also cause the one or more processors to generate a second error measure by comparing a second subset of the sensor data to the second predicted sensor data. The instructions further cause the one or more processors to determine, based at least in part on a range of the second sensor data, a test coverage metric of the second test matrix. The instructions also cause the one or more processors to provide an output to a display device, the output indicating the first error measure, the second error measure, and the test coverage metric.

The features, functions, and advantages described herein can be achieved independently in various implementations or may be combined in yet other implementations, further details of which can be found with reference to the following description and drawings.

DETAILED DESCRIPTION

Figure 1:
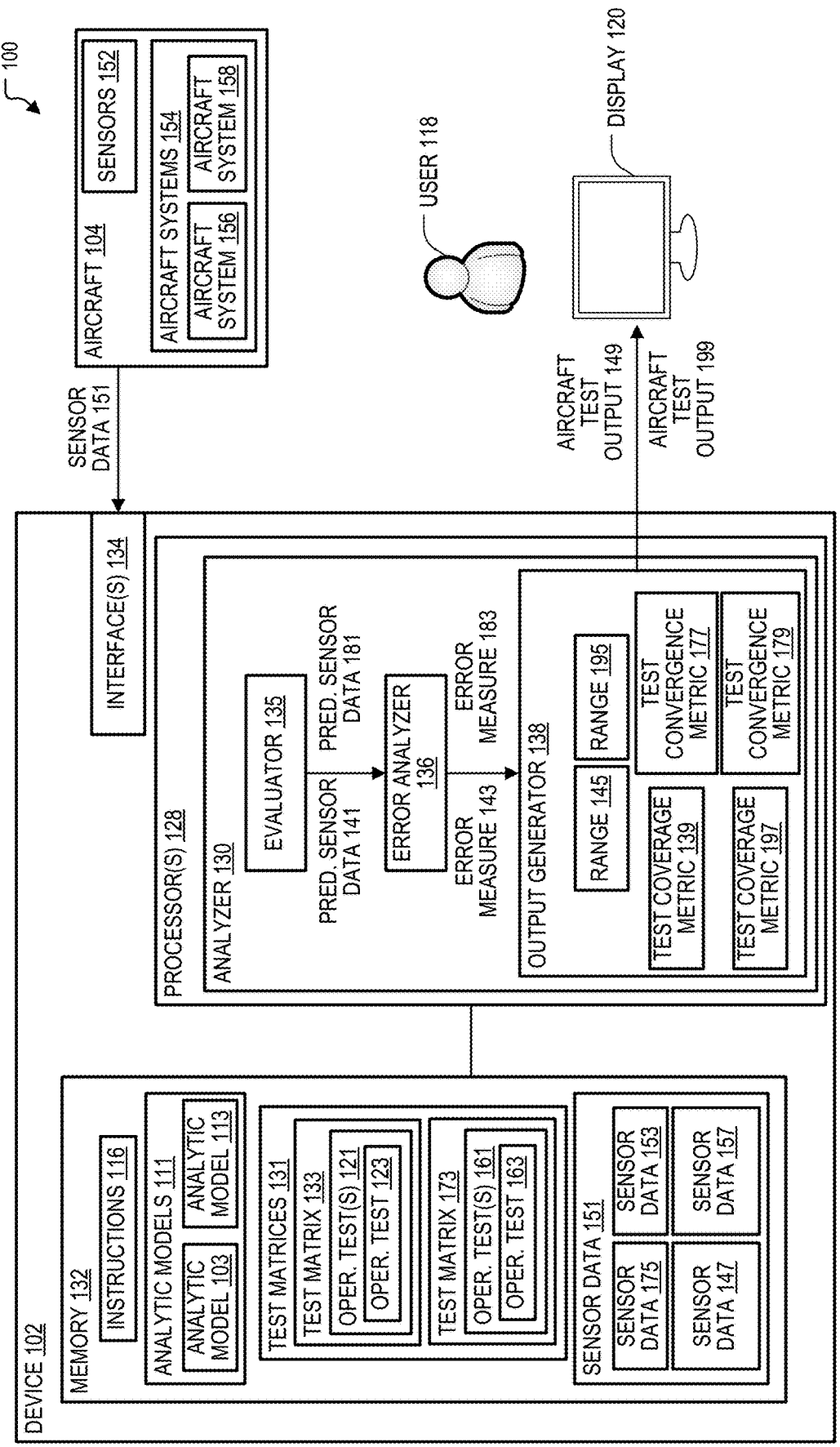
FIG. 1 is a diagram that illustrates a system configured to perform operational testing of aircraft systems.

Aspects disclosed herein present operational testing of aircraft systems. For example, an aircraft includes one or more sensors that monitor aircraft conditions. An analyzer has access to test matrices for aircraft systems of the aircraft. For example, a first test matrix of a first aircraft system indicates a set of operational tests for the first aircraft system. As an illustrative example, the first aircraft system includes a fuel system of the aircraft and the first operational test is for determining the effects of changes in altitude on fuel consumption. During performance of a first operational test of the first test matrix, sensor data from the sensors is collected. For example, the sensor data includes first sensor data (e.g., detected altitude measurements) specified by the first operational test. The sensor data also includes other sensor data not specified by the first test matrix. As an illustrative example, the sensor data includes detected engine temperature measurements.

The analyzer evaluates the first operational test by processing the first sensor data (e.g., detected altitude) using a first analytic model of the first aircraft system (e.g., the fuel system). For example, the analyzer generates first predicted sensor data (e.g., predicted fuel consumption) by using the first analytic model to process the first sensor data (e.g., detected altitude). The analyzer generates a first error measure by comparing a first subset of the sensor data (e.g., detected fuel consumption) and the first predicted sensor data (e.g., the predicted fuel consumption).

Additionally, analytic models of other aircraft systems are used to process sensor data generated during the first operational test. For example, the analyzer evaluates a second operational test (e.g., mapping airspeed to engine temperature) of the second test matrix by using a second analytic model of a second aircraft system (e.g., an engine). To illustrate, the analyzer generates second predicted sensor data (e.g., predicted engine temperature) by using the second analytic model to process the second sensor data (e.g., detected engine temperature).

The analyzer generates a second error measure by comparing a second subset of the sensor data (e.g., detected engine temperature) and the second predicted sensor data (e.g., the predicted engine temperature). A portion of the second test matrix can thus be covered during performance of the first operational test of the first test matrix without having to separately perform the second operational test. In a particular example, the first operational test could be scheduled subsequent to a change in the aircraft that is expected to have an effect on the first aircraft system and not expected to have any effect on the second aircraft system. The analyzer can evaluate the second operational test using the sensor data generated during the first aircraft system and could discover unexpected effects on the second aircraft system of the change to the aircraft.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors 128 ("processor(s)" in FIG. 1), which indicates that in some implementations the system 100 includes a single processor 128 and in other implementations the system 100 includes multiple processors 128. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Referring to FIG. 1, a system configured to perform operational testing of aircraft systems is shown and generally designated system 100. The system 100 includes a device 102 that includes a memory 132 coupled to one or more processors 128. In a particular aspect, the device 102 includes one or more interfaces 134 that are configured to receive sensor data 151. In a particular aspect, the interface 134 (e.g., a communication interface) includes at least one of a wired interface or a wireless interface. The memory 132 includes a computer-readable medium (e.g., a computer-readable storage device) that stores instructions 116 that are executable by the processor 128. The instructions 116 are executable to initiate, perform, or control operations to aid in performing operational testing of aircraft systems 154.

In a particular example, the memory 132 is configured to store analytic models 111 of the aircraft systems 154. In a particular example, the analytic models 111 include at least one of a physics model, an empirical model, a statistical model, a simulation model, or a combination thereof. In various examples, the analytic models 111 include an engine model, a fuel system model, a nose wheel steering system model, a stabilizer system model, an air-conditioning system model, a communication system model, a propulsion system model, an electrical system model, an environmental system model, a hydraulic system model, or a combination thereof. To illustrate, the analytic models 111 include a first analytic model 103 of a first aircraft system 156 (e.g., a fuel system), a second analytic model 113 of a second aircraft system 158 (e.g., an engine), one or more additional analytic models of one or more additional aircraft systems, or a combination thereof. In a particular aspect, the analytic models 111 are configured to predict aircraft system responses based on sensor data 151. For example, the first analytic model 103 is configured to predict responses of the first aircraft system 156 (e.g., the fuel system) to at least a portion of the sensor data 151, the second analytic model 113 is configured to predict responses of the second aircraft system 158 (e.g., the engine) to at least a portion of the sensor data 151, and one or more additional analytic models are configured to predict responses of one or more additional aircraft systems to at least some of the sensor data 151. The sensor data 151 is generated by one or more sensors 152 that are configured to monitor the aircraft systems 154 of an aircraft 104. In a particular aspect, the sensors 152 include one or more on-board sensors, one or more flight-test sensors, or a combination thereof. In a particular aspect, one or more of the sensors 152 are at least one of coupled to, proximate to, internal to, external to, integrated into, or separate from the aircraft 104.

In a particular aspect, the memory 132 is configured to store test matrices 131 for the aircraft systems 154. For example, the test matrices 131 include a first test matrix 133 for the first aircraft system 156 (e.g., the fuel system), a second test matrix 173 for the second aircraft system 158 (e.g., the engine), one or more additional test matrices for one or more additional aircraft systems, or a combination thereof. The first test matrix 133 describes one or more first operational tests 121. For example, the first operational tests 121 include a first operational test 123. In a particular example, the first operational test 123 includes testing changes in fuel consumption of the first aircraft system 156 (e.g., the fuel system) responsive to changes in altitude. The second test matrix 173 describes one or more second operational tests 161. For example, the second operational tests 161 include a second operational test 163. In a particular example, the second operational test 163 includes testing changes in engine temperature of the second aircraft system 158 (e.g., the engine) response to changes in airspeed. In some implementations, one or more additional test matrices describe one or more additional operational tests for one or more additional aircraft systems.

The processor 128 includes an analyzer 130 that can be implemented at least in part by the processor 128 executing the instructions 116. The processor 128 can be implemented as a single processor or as multiple processors, such as in a multi-core configuration, a multi-processor configuration, a distributed computing configuration, a cloud computing configuration, or any combination thereof. In some implementations, one or more portions of the analyzer 130 are implemented by the processor 128 using dedicated hardware, firmware, or a combination thereof.

The analyzer 130 includes an evaluator 135 coupled via an error analyzer 136 to an output generator 138. The output generator 138 is coupled to a display device 120. Although, the device 102, the aircraft 104, and the display device 120 are illustrated as separate, in some implementations two or more components of the device 102, the aircraft 104, or the display device 120 are combined. For example, in a particular implementation, the display device 120, one or more components of the device 102, or a combination thereof, are integrated into or onboard the aircraft 104. The evaluator 135 is configured to evaluate an operational test by processing sensor data using an analytic model. For example, the evaluator 135 generates predicted sensor data based on the evaluation. The error analyzer 136 is configured to generate an error measure based on a comparison of predicted sensor data and a subset of sensor data. The output generator 138 is configured to generate an aircraft test output based on the error measure.

During operation, the analyzer 130 obtains the test matrices 131. For example, the analyzer 130 obtains the test matrices 131 from a test server during a pre-flight sequence. The aircraft 104 performs the first operational test 123. In a particular implementation, the analyzer 130 sends an instruction to the aircraft 104 to initiate the first operational test 123 (e.g., fly at various altitudes during a particular time period or during a flight). In an alternative implementation, a pilot initiates the first operational test 123. In a particular aspect, the first operational test 123 includes at least one of a ground test, a taxi test, or a flight test that is to be performed while the aircraft 104 is on the ground (e.g., parked), while the aircraft 104 is taxiing, or during flight, respectively.

The sensors 152 generate sensor data 151 during the first operational test 123. For example, the sensors 152 include a first sensor, a second sensor, a third sensor, and a fourth sensor that monitor changes in altitude, changes in fuel consumption, changes in airspeed, and changes in engine temperature, respectively. To illustrate, the sensor data 151 includes sensor data 175 (e.g., altitude measurements), sensor data 147 (e.g., fuel consumption measurements), sensor data 153 (e.g., airspeed measurements), sensor data 157

(e.g., engine temperature measurements), or a combination thereof. Although the sensor data 175, the sensor data 147, the sensor data 153, and the sensor data 157 are illustrated in FIG. 1 as distinct subsets of the sensor data 151, in some examples, one or more of the sensor data 175, the sensor data 147, the sensor data 153, or the sensor data 157 may overlap.

The analyzer 130 obtains the sensor data 151 from the sensors 152. The sensor data 151 includes the sensor data 175 (e.g., altitude measurements) in a first range 145 (e.g., between a first altitude and a second altitude) specified by the first test matrix 133. The sensor data 151 includes the sensor data 153 (e.g., airspeed measurements) that is not specified by the first test matrix 133.

The analyzer 130 evaluates one or more operational tests by processing the sensor data 151 based on the analytic models 111. For example, the evaluator 135, in response to determining that the sensor data 151 is generated during the first operational test 123, evaluates the first operational test 123 by using the first analytic model 103 to process the sensor data 175 (e.g., altitude measurements), as further described with reference to FIG. 2. To illustrate, the evaluator 135 generates first predicted sensor data 141 based on the evaluation of the first operational test 123. In a particular example, the evaluator 135, in response to determining that the first operational test 123 tests for responsiveness of the first aircraft system 156 (e.g., the fuel system) to changes in altitude, provides the sensor data 175 (e.g., altitude measurements) as input to the first analytic model 103, and the first analytic model 103 determines a predicted response of the first aircraft system 156 to the sensor data 175. To illustrate, the predicted response indicates predicted sensor data for various sensors. In a particular aspect, the evaluator 135, in response to determining that the first operational test 123 tests for changes in fuel consumption of the first aircraft system 156 (e.g., the fuel system), extracts the first predicted sensor data 141 (e.g., predicted fuel consumption) from the predicted response.

The error analyzer 136 generates a first error measure 143 based on a comparison of the first predicted sensor data 141 (e.g., the predicted fuel consumption) and the sensor data 147 (e.g., the detected fuel consumption), as further described with reference to FIG. 2. The output generator 138 determines a first test coverage metric 139 based at least in part on a first range 145 of the sensor data 175 (e.g., the detected altitude), as further described with reference to FIG. 2. For example, the first test coverage metric 139 indicates how much of the first test matrix 133 has been covered. In a particular aspect, the output generator 138 determines a first test convergence metric 177 based on the first error measure 143, as further described with reference to FIG. 2. The first test convergence metric 177 indicates whether the results of evaluating the first operational tests 121 of the first test matrix 133 have converged. The output generator 138 generates a first aircraft test output 149 indicating the first error measure 143, the first test coverage metric 139, the first test convergence metric 177, or a combination thereof.

In a particular aspect, the output generator 138, in response to determining that the first error measure 143 fails to satisfy an error criterion, generates the first aircraft test output 149 indicating that an error is detected in the first analytic model 103, the first aircraft system 156, or both. In a particular aspect, the output generator 138, in response to determining that the first test coverage metric 139 satisfies a coverage criterion (e.g., at least 90% coverage), that the first test convergence metric 177 satisfies a convergence criterion (e.g., standard deviation converged within a threshold range with a 95% confidence), or both, generates the first aircraft test output 149 indicating that testing of the first analytic model 103 is complete, designates the first analytic model 103 as satisfying testing completion criteria, or both.

The analyzer 130 uses the sensor data 151 generated during the first operational test 123 to evaluate one or more additional operational tests. For example, the evaluator 135, in response to determining that the second analytic model 113 is not designated as satisfying testing completion criteria, evaluates the second operational test 163 by using the second analytic model 113 to process the sensor data 153 (e.g., airspeed measurements) generated during the first operational test 123, as further described with reference to FIG. 2. To illustrate, the evaluator 135 generates second predicted sensor data 181 based on the evaluation of the second operational test 163. In a particular example, the evaluator 135, in response to determining that the second operational test 163 tests for responsiveness of the second aircraft system 158 (e.g., the engine) to changes in airspeed, provides the sensor data 153 (e.g., airspeed measurements) as input to the second analytic model 113, and the second analytic model 113 determines a predicted response of the second aircraft system 158 to the sensor data 153. To illustrate, the predicted response indicates predicted sensor data for various sensors. In a particular aspect, the evaluator 135, in response to determining that the second operational test 163 tests for changes in engine temperature of the second aircraft system 158 (e.g., the engine), extracts the second predicted sensor data 181 (e.g., predicted engine temperature) from the predicted response.

The error analyzer 136 generates a second error measure 183 based on a comparison of the second predicted sensor data 181 (e.g., the predicted engine temperature) and the sensor data 157 (e.g., the detected engine temperature), as further described with reference to FIG. 2. The output generator 138 determines a second test coverage metric 197 based at least in part on a second range 195 of the sensor data 153 (e.g., the detected engine temperature), as further described with reference to FIG. 2. For example, the second test coverage metric 197 indicates how much of the second test matrix 173 has been covered. In a particular aspect, the output generator 138 determines a second test convergence metric 179 based on the second error measure 183, as further described with reference to FIG. 2. The second test convergence metric 179 indicates whether the results of the evaluations of the second operational tests 161 of the second test matrix 173 have converged. The output generator 138 generates a second aircraft test output 199 indicating the second error measure 183, the second test coverage metric 197, the second test convergence metric 179, or a combination thereof.

In a particular aspect, the output generator 138, in response to determining that the second error measure 183 fails to satisfy an error criterion, generates the second aircraft test output 199 indicating that an error is detected in the second analytic model 113, the second aircraft system 158, or both. In a particular aspect, the output generator 138, in response to determining that the second test coverage metric 197 satisfies a coverage criterion (e.g., at least 90% coverage), that the second test convergence metric 179 satisfies a convergence criterion (e.g., standard deviation converged within a threshold range with a 95% confidence), or both, generates the second aircraft test output 199 indicating that testing of the second analytic model 113 is complete, designates the second analytic model 113 as satisfying testing completion criteria, or both. Similarly, the analyzer 130 can use the sensor data 151 generated during the first operational test 123 to evaluate one or more additional operational tests. In a particular implementation, over time as more analytic models are designated as satisfying testing completion criteria, fewer operational tests are evaluated.

In some implementations, the analyzer 130, in response to determining that an aircraft system has been updated, resets the coverage metric and the convergence metric for an analytic model for one or more of the aircraft systems 154. For example, the analyzer 130, in response to determining that the second aircraft system 158 has been updated at a first time, resets the second test coverage metric 197 to a default value (e.g., indicating no coverage), the second test convergence metric 179 to a default value (e.g., indicating no convergence), or both. In a particular implementation, the analyzer 130, in response to determining that the second aircraft system 158 has been updated at the first time, resets the first test coverage metric 139 to a default value (e.g., indicating no coverage), the first test convergence metric 177 to a default value (e.g., indicating no convergence), or both. Operational testing of analytic models can thus be restarted subsequent to an update.

The output generator 138 provides the first aircraft test output 149, the second aircraft test output 199, or both, to the display device 120. In a particular example, a user 118 can submit the first analytic model 103 or the second analytic model 113 that has satisfied testing completion criteria for certification.

The system 100 thus enables automatic evaluation of one or more operational tests (e.g., the second operational test 163) based on the sensor data 151 generated during performance of another operational test (e.g., the first operational test 123). For example, the sensor data 151 generated during the first operational test 123 can be automatically used to evaluate multiple operational tests that have not satisfied testing completion criteria. In a particular example, the first operational test 123 is performed subsequent to a change to the aircraft 104 that is not expected to have an effect on the second aircraft system 158. Automatically evaluating the second operational test 163 can help identify any unexpected effects on the second aircraft system 158. For example, the output generator 138 can generate the second aircraft test output 199 indicating an error in the second analytic model 113, the second aircraft system 158, or both, in response to determining that the second error measure 183 fails to satisfy an error criterion.

Although the evaluator 135, the error analyzer 136, and the output generator 138 are depicted as separate components, in other implementations the described functionality of two or more of the evaluator 135, the error analyzer 136, and the output generator 138 can be performed by a single component. In some implementations, one or more components of each of the evaluator 135, the error analyzer 136, the output generator 138, the analyzer 130, the processor 128, the device 102, the aircraft 104, or the display device 120 can be represented in hardware, such as via an application-specific integrated circuit (ASIC) or a field-programmable gate array (FPGA), or the operations described with reference to the elements may be performed by a processor executing computer-readable instructions.

Figure 2:
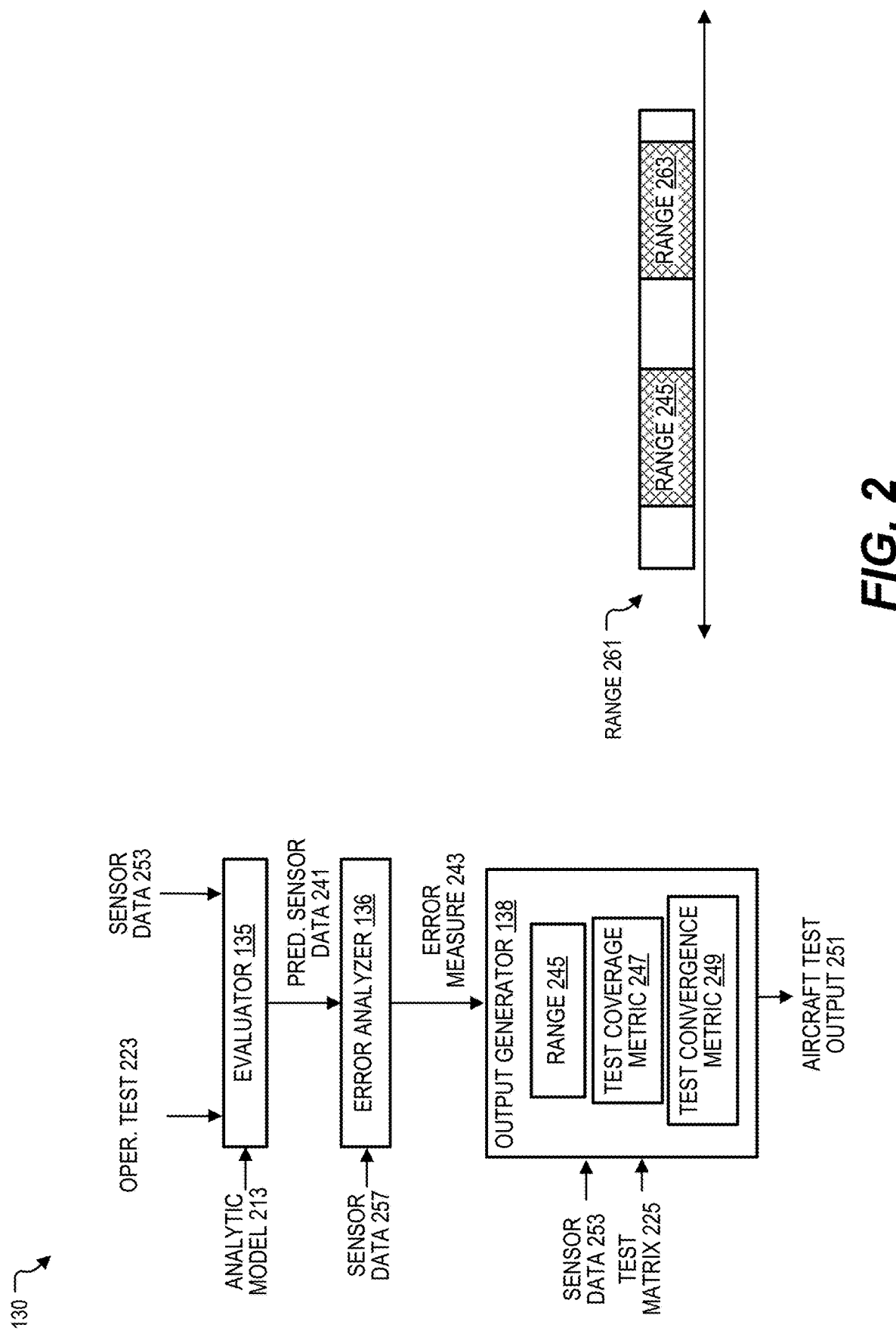
FIG. 2 is a diagram of an example of an analyzer of FIG. 1.

Referring to FIG. 2, an example of the analyzer 130 is shown. In a first example, an operational test 223, an analytic model 213, sensor data 253, predicted sensor data 241, a sensor data 257, an error measure 243, a range 245, a test matrix 225, a test coverage metric 247, a test convergence metric 249, and an aircraft test output 251 correspond to the first operational test 123, the first analytic model 103, the sensor data 175, the first predicted sensor data 141, the sensor data 147, the first error measure 143, the first range 145, the first test matrix 133, the first test coverage metric 139, the first test convergence metric 177, and the first aircraft test output 149 of FIG. 1, respectively. In a second example, the operational test 223, the analytic model 213, the sensor data 253, the predicted sensor data 241, the sensor data 257, the error measure 243, the range 245, the test matrix 225, the test coverage metric 247, the test convergence metric 249, and the aircraft test output 251 correspond to the second operational test 163, the second analytic model 113, the sensor data 153, the second predicted sensor data 181, the sensor data 157, the second error measure 183, the second range 195, the second test matrix 173, the second test coverage metric 197, the second test convergence metric 179, and the second aircraft test output 199 of FIG. 1, respectively.

During operation, the evaluator 135 evaluates the operational test 223 of the test matrix 225 by using the analytic model 213 to process the sensor data 253. The evaluator 135 generates the predicted sensor data 241 based on the evaluation. For example, the evaluator 135, in response to determining that the operational test 223 for a particular aircraft system of the aircraft systems 154 tests for changes in a second type of sensor data responsive to changes in a first type of sensor data, uses the analytic model 213 for the particular aircraft system to process the sensor data 253 of the first type to generate the predicted sensor data 241 of the second type.

The error analyzer 136 generates an error measure 243 based on a comparison of the sensor data 257 (e.g., detected sensor data of the second type) with the predicted sensor data 241. In a particular example, the error measure 243 indicates a difference, a ratio, or both, of the sensor data 257 and the predicted sensor data 241.

The output generator 138 determines the range 245 of (e.g., a minimum value and a maximum value indicated by) the sensor data 253 that is generated by a first sensor of the sensors 152. The output generator 138 determines, based on the range 245, the test coverage metric 247 for the test matrix 225. For example, the test matrix 225 indicates a first range 261 (e.g., a first altitude to a second altitude or a first airspeed to a second airspeed) of data of the first sensor that is indicated by the test matrix 225. To illustrate, the test matrix 225 indicates that responses of the particular aircraft system are to be tested for the first range 145 of data of the first sensor. The output generator 138 updates the test coverage metric 247 to indicate that the range 245 of data of the first sensor has been tested.

In a particular aspect, the analyzer 130 receives sets of sensor data during a data collection period. In a particular example, the data collection period is initiated in response to a most recent update of the particular aircraft system, a most recent update of any of the aircraft systems 154, a most recent update of another particular aircraft system of the aircraft systems 154, or a combination thereof. In a particular aspect, the data collection period is initiated in response to receiving a user input.

In a particular aspect, the analyzer 130 updates the test coverage metric 247 during the data collection period based on the sets of sensor data. For example, the analyzer 130 determines the range 245 of the sensor data 253 that is generated by the first sensor during a first time period of the data collection period and determines a second range 263 of sensor data generated by the first sensor during a second time period of the data collection period. In a particular aspect, the first time period is during performance of the operational test 223 and the second time period is during performance of another operational test of the test matrix 225. The analyzer 130 updates the test coverage metric 247 to indicate that the range 245 and the second range 263 has been tested out of the first range 261 indicated by the test matrix 225. In a particular aspect, the output generator 138 updates the test coverage metric 247 to indicate a proportion (e.g., a percentage) of the first range 261 that has been tested during the data collection period.

In a particular aspect, the output generator 138 determines a test convergence metric 249 based on the sets of sensor data received during the data collection period. For example, the output generator 138 determines the test convergence metric 249 to indicate whether error measures corresponding to the sets of sensor data are converging. To illustrate, the error analyzer 136 determines the error measure 243 corresponding to the sensor data 253 that is generated by the first sensor during the first time period and determines a second error measure corresponding to the sensor data generated by the first sensor during the second time period.

The output generator 138 determines the test convergence metric 249 by using statistical methods to process the error measure 243, the second error measure, one or more additional error measures corresponding to one or more additional sets of sensor data, or a combination thereof. For example, the output generator 138 updates the test convergence metric 249 to indicate a standard deviation calculated based on the error measure 243, the second error measure, the additional error measures, or a combination thereof. In a particular aspect, the output generator 138 updates the test convergence metric 249 to indicate a confidence interval associated with the standard deviation.

The output generator 138 generates the aircraft test output 251 based on the error measure 243, the test coverage metric 247, the test convergence metric 249, or a combination thereof. In a particular aspect, the output generator 138, in response to determining that the error measure 243 fails to satisfy (e.g., is greater than or equal to) an error criterion (e.g., an error threshold), generates the aircraft test output 251 to indicate that an error is detected in the analytic model 213, the particular aircraft system, or both.

In a particular aspect, the output generator 138, in response to determining that the test coverage metric 247 satisfies a coverage criterion, that the test convergence metric 249 satisfies a convergence metric, or both, generates the aircraft test output 251 indicating that testing of the analytic model 213 is complete.

In a particular example, the analyzer 130 evaluates the operational test 223 of the test matrix 225 based on the sensor data 253 that is generated during performing the operational test 223 or during performance of another operational test of the test matrix 225. In an alternative example, the analyzer 130 evaluates the operational test 223 of the test matrix 225 without performing an operational test of the test matrix 225. In this example, the analyzer 130 evaluates the operational test 223 based on the sensor data 253 that is generated during performance of another operational test of another test matrix. The analyzer 130 thus enables covering at least part of the test matrix 225 based on sensor data generated during performance of an operational test that is not included in the test matrix 225.

Figure 3:
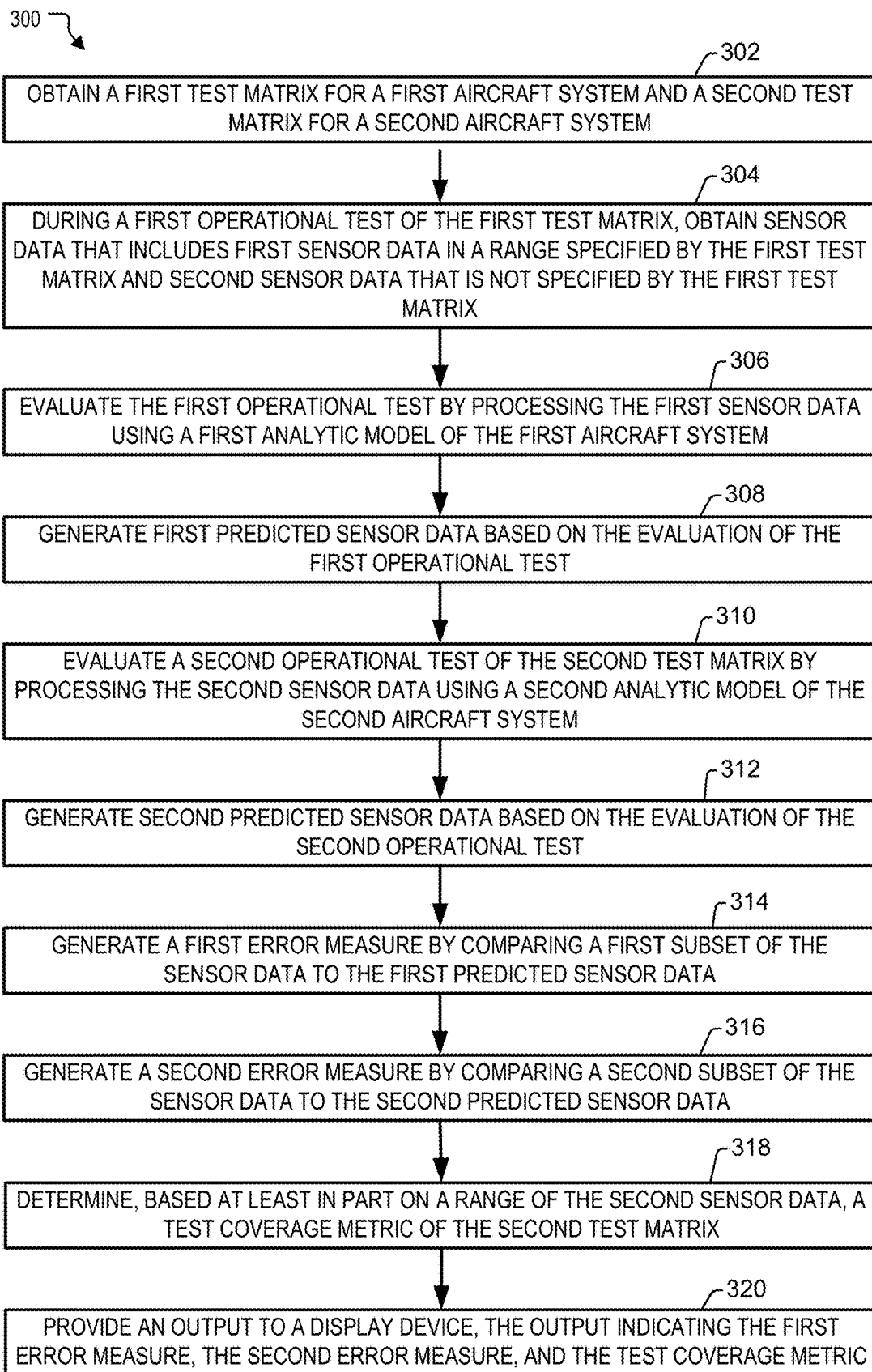
FIG. 3 is a flow chart of an example of a method of operational testing of aircraft systems.

Referring to FIG. 3, an example of a method of operational testing of aircraft systems is shown and generally designated method 300. In a particular aspect, one or more operations of the method 300 are performed by the evaluator 135, the error analyzer 136, the output generator 138, the analyzer 130, the processor 128, the device 102, the aircraft 104, the system 100 of FIG. 1, or a combination thereof.

The method 300 includes obtaining a first test matrix for a first aircraft system and a second test matrix for a second aircraft system, at 302. For example, the analyzer 130 of FIG. 1 obtains the first test matrix 133 for the first aircraft system 156 and the second test matrix 173 for the second aircraft system 158.

The method 300 also includes, during a first operational test of the first test matrix, obtaining sensor data that includes first sensor data in a range specified by the first test matrix and second sensor data that is not specified by the first test matrix, at 304. For example, the evaluator 135 of FIG. 1, during a first operational test 123 of the first test matrix 133, obtains the sensor data 151 that includes the sensor data 175 (e.g., detected altitude) in the first range 145 (e.g., within the first range 261) specified by the first test matrix 133 and that also includes the sensor data 153 (e.g., detected airspeed) that is not specified by the first test matrix 133, as described with reference to FIGS. 1-2.

The method 300 further includes evaluating the first operational test by processing the first sensor data using a first analytic model of the first aircraft system, at 306. For example, the evaluator 135 of FIG. 1 evaluates the first operational test 123 by processing the sensor data 175 using the first analytic model 103 of the first aircraft system 156, as described with reference to FIGS. 1-2.

The method 300 also includes generating first predicted sensor data based on the evaluation of the first operational test, at 308. For example, the evaluator 135 of FIG. 1 generates the first predicted sensor data 141 based on the evaluation of the first operational test 123, as described with reference to FIGS. 1-2.

The method 300 further includes evaluating a second operational test of the second test matrix by processing the second sensor data using a second analytic model of the second aircraft system, at 310. For example, the evaluator 135 of FIG. 1 evaluates the second operational test 163 of the second test matrix 173 by processing the sensor data 153 using the second analytic model 113 of the second aircraft system 158, as described with reference to FIGS. 1-2.

The method 300 also includes generating second predicted sensor data based on the evaluation of the second operational test, at 312. For example, the evaluator 135 of FIG. 1 generates the second predicted sensor data 181 based on the evaluation of the second operational test 163, as described with reference to FIGS. 1-2.

The method 300 further includes generating a first error measure by comparing a first subset of the sensor data to the first predicted sensor data, at 314. For example, the error analyzer 136 of FIG. 1 generates the first error measure 143 by comparing the sensor data 147 to the first predicted sensor data 141, as described with reference to FIGS. 1-2.

The method 300 also includes generating a second error measure by comparing a second subset of the sensor data to the second predicted sensor data, at 316. For example, the evaluator 135 of FIG. 1 generates the second error measure 183 by comparing the sensor data 157 to the second predicted sensor data 181, as described with reference to FIGS. 1-2.

The method 300 further includes determining, based at least in part on a range of the second sensor data, a test coverage metric of the second test matrix, at 318. For example, the output generator 138 of FIG. 1 determines, based at least in part on the second range 195 of the sensor data 153, the second test coverage metric 197 of the second test matrix 173, as described with reference to FIGS. 1-2.

The method 300 also includes providing an output to a display device, the output indicating the first error measure, the second error measure, and the test coverage metric, at 320. For example, the output generator 138 of FIG. 1 provides the first aircraft test output 149, the second aircraft test output 199, or both, to the display device 120. The first aircraft test output 149, the second aircraft test output 199, or both, as described with reference to FIGS. 1-2.

The method 300 thus enables automatic evaluation of the second operational test 163 based on the sensor data 151 generated during performance of the first operational test 123. In a particular example, the sensor data 151 generated during the first operational test 123 can be automatically used to evaluate multiple operational tests of multiple matrices using analytic models of multiple aircraft systems.

Figure 4:
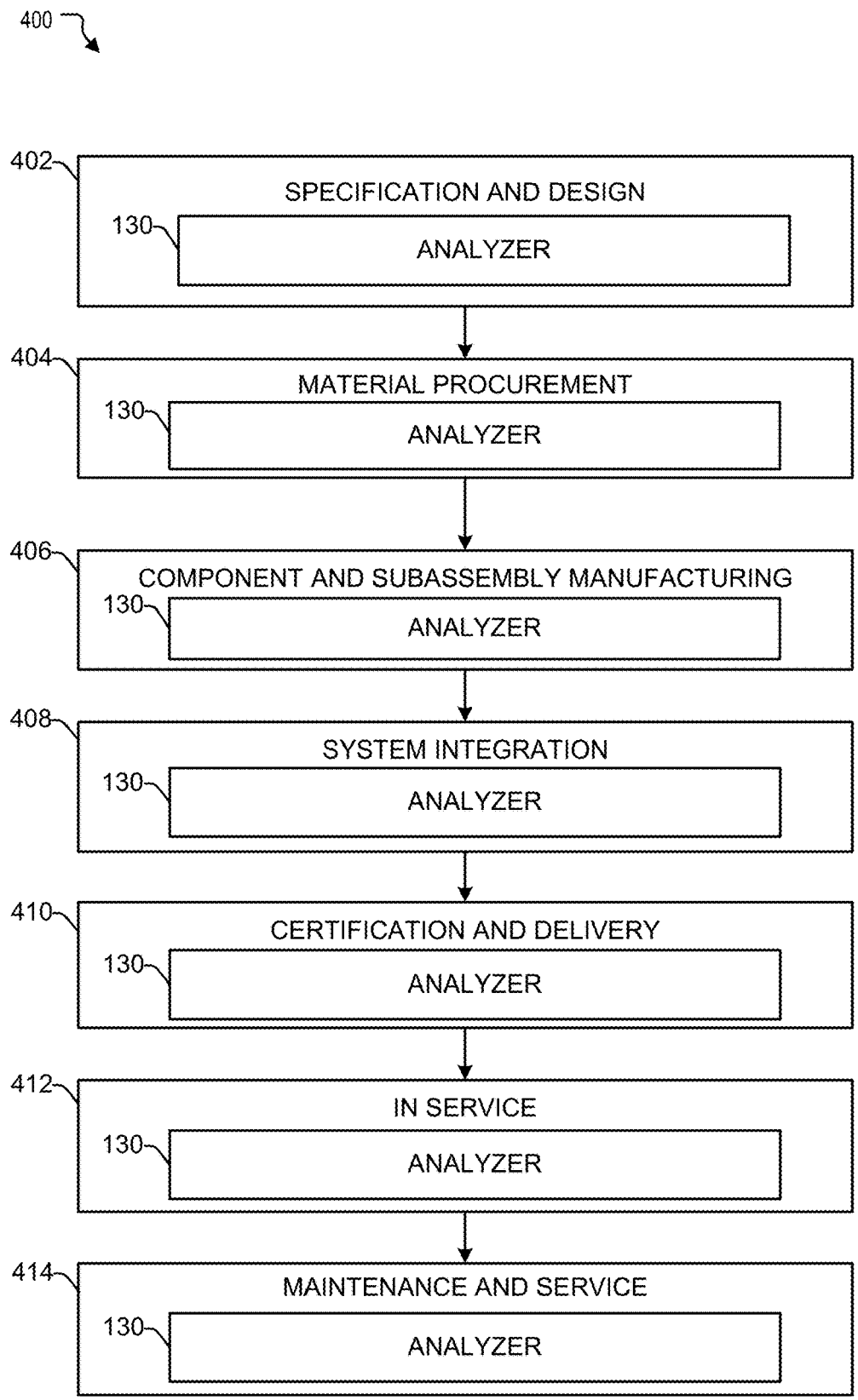
FIG. 4 is a flow chart illustrating a life cycle of an aircraft that is configured to perform operational testing of aircraft systems.

Referring to FIG. 4, a flowchart illustrative of a life cycle of an aircraft that includes the analyzer 130 is shown and designated method 400. During pre-production, the exemplary method 400 includes, at 402, specification and design of an aircraft, such as the aircraft 500 described with reference to FIG. 5. During specification and design of the aircraft, the method 400 may include specification and design of the analyzer 130. At 404, the method 400 includes material procurement, which may include procuring materials for the analyzer 130.

During production, the method 400 includes, at 406, component and subassembly manufacturing and, at 408, system integration of the aircraft. For example, the method 400 may include component and subassembly manufacturing of the analyzer 130 and system integration of the analyzer 130. At 410, the method 400 includes certification and delivery of the aircraft and, at 412, placing the aircraft in service. In a particular aspect, certification and delivery may include operational testing of the aircraft. Certification and delivery may include certification of the analyzer 130 to place the analyzer 130 in service. While in service by a customer, the aircraft may be scheduled for routine maintenance and service (which may also include modification, reconfiguration, refurbishment, operational testing, and so on). At 414, the method 400 includes performing maintenance and service on the aircraft, which may include performing maintenance and service on the analyzer 130. In a particular aspect, maintenance and service of the aircraft may include operational testing.

Each of the processes of the method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 500 as shown in FIG. 5.

Figure 5:
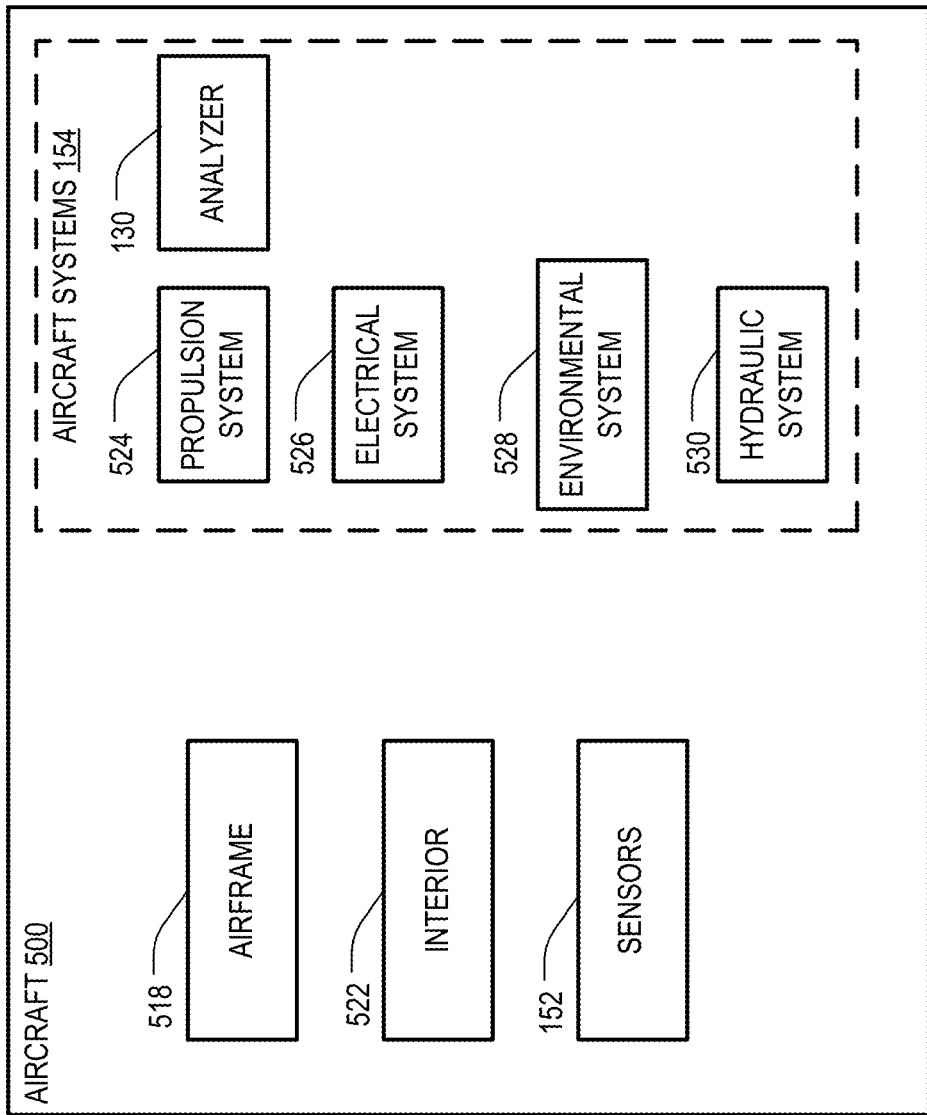
FIG. 5 is a block diagram of an aircraft that is configured to perform operational testing of aircraft systems.

In the example of FIG. 5, the aircraft 500 includes an airframe 518 with the aircraft systems 154, the sensors 152, and an interior 522. Examples of the aircraft systems 154 include one or more of a propulsion system 524, an electrical system 526, an environmental system 528, a hydraulic system 530, and the analyzer 130. Any number of other systems may be included. In a particular aspect, the aircraft 500 corresponds to the aircraft 104 of FIG. 1.

Figure 6:
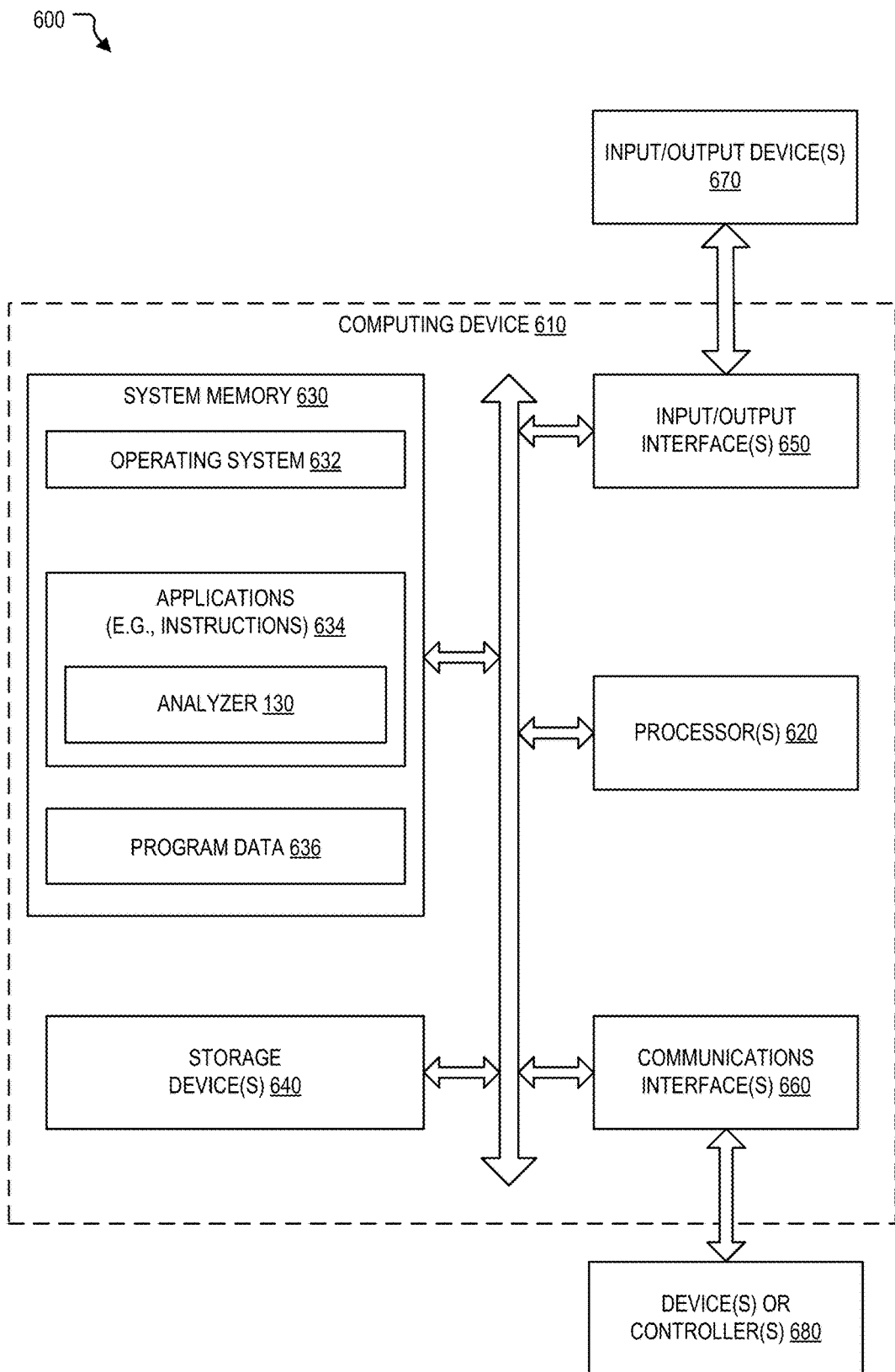
FIG. 6 is a block diagram of a computing environment including a computing device configured to support aspects of computer-implemented methods and computer-executable program instructions (or code) according to the present disclosure.

FIG. 6 is a block diagram of a computing environment 600 including a computing device 610 configured to support aspects of computer-implemented methods and computer-executable program instructions (or code) according to the present disclosure. For example, the computing device 610, or portions thereof, is configured to execute instructions to initiate, perform, or control one or more operations described with reference to FIGS. 1-6.

The computing device 610 includes one or more processors 620. In a particular aspect, the processor(s) 620 correspond to the processor 128 of FIG. 1. The processor(s) 620 are configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which may include a basic input/output system for booting the computing device 610 as well as a full operating system to enable the computing device 610 to interact with users, other programs, and other devices. The system memory 630 stores system (program) data 636, such as the analytic models 111, the test matrices 131, the sensor data 151, the first predicted sensor data 141, the second predicted sensor data 181, the first error measure 143, the second error measure 183, the first range 145, the second range 195, the first test coverage metric 139, the second test coverage metric 197, the first test convergence metric 177, the second test convergence metric 179, the first aircraft test output 149, the second aircraft test output 199, the display device 120 of FIG. 1, the operational test 223, the sensor data 253, the analytic model 213, the predicted sensor data 241, the sensor data 257, the error measure 243, the test matrix 225, the range 245, the test coverage metric 247, the test convergence metric 249, the aircraft test output 251, the first range 261, the second range 263 of FIG. 2, or a combination thereof.

The system memory 630 includes one or more applications 634 (e.g., sets of instructions) executable by the processor(s) 620. As an example, the one or more applications 634 include instructions executable by the processor(s) 620 to initiate, control, or perform one or more operations described with reference to FIGS. 1-6. To illustrate, the one or more applications 634 include instructions executable by the processor(s) 620 to initiate, control, or perform one or more operations described with reference to the analyzer 130.

In a particular implementation, the system memory 630 includes a non-transitory, computer-readable medium (e.g., a computer-readable storage device) storing the instructions that, when executed by the processor(s) 620, cause the processor(s) 620 to initiate, perform, or control operations to perform or analyze operational testing of aircraft systems. In a particular aspect, the instructions cause the processor(s) 620 to obtain a first test matrix for a first aircraft system and a second test matrix for a second aircraft system. The instructions also cause the processor(s) 620 to, during a first operational test of the first test matrix, obtain sensor data that includes first sensor data in a range specified by the first test matrix and second sensor data that is not specified by the first test matrix. The instructions further cause the processor(s) 620 to evaluate the first operational test by processing the first sensor data using a first analytic model of the first aircraft system. The instructions also cause the processor(s) 620 to generate first predicted sensor data based on the evaluation of the first operational test. The instructions further cause the processor(s) 620 to evaluate a second operational test of the second test matrix by processing the second sensor data using a second analytic model of the second aircraft system. The instructions also cause the processor(s) 620 to generate second predicted sensor data based on the evaluation of the second operational test. The instructions further cause the processor(s) 620 to generate a first error measure by comparing a first subset of the sensor data to the first predicted sensor data. The instructions also cause the processor(s) 620 to generate a second error measure by comparing a second subset of the sensor data to the second predicted sensor data. The instructions further cause the processor(s) 620 to determine, based at least in part on a range of the second sensor data, a test coverage metric of the second test matrix. The instructions also cause the processor(s) 620 to provide an output to a display device, the output indicating the first error measure, the second error measure, and the test coverage metric.

In a particular aspect, each of the first operational test and the second operational test includes at least one of a ground test, a taxi test, or a flight test. In a particular aspect, the instructions cause the processor(s) 620 to determine that the second test matrix indicates a first range of data of a first sensor. The instructions also cause the processor(s) 620 to, in response to determining that a second range of data from the first sensor has been processed using the second analytic model during a data collection period, determine the test coverage metric based at least in part on a third range of data that is included in the first range of data and is not included in the second range of data. The range of the second sensor data includes the second range of data from the first sensor.

In a particular aspect, the instructions cause the processor(s) 620 to obtain sets of sensor data during a data collection period. The sets of sensor data include the sensor data. The instructions also cause the processor(s) 620 to evaluate a plurality of second operational tests of the second test matrix based on the second analytic model and the sets of sensor data. The plurality of second operational tests includes the second operational test. The instructions further cause the processor(s) 620 to determine a plurality of second error measures based on the evaluation of the plurality of second operational tests. The plurality of second error measures includes the second error measure. The instructions also cause the processor(s) 620 to determine a test convergence metric of the second test matrix based on the plurality of second error measures. In a particular aspect, the instructions cause the processor(s) 620 to, in response to determining that the test coverage metric satisfies a coverage criterion and that a test convergence metric of the second test matrix satisfies a convergence criterion, generate the output to indicate that testing of the second analytic model is complete. In a particular aspect, the instructions cause the processor(s) 620 to, in response to determining that the second error measure fails to satisfy an error criterion, generate the output to indicate that an error is detected in the second analytic model, the second aircraft system, or both.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610. In a particular aspect, the system memory 630 includes the memory 132 of FIG. 1.

The one or more input/output interfaces 650 that enable the computing device 610 to communicate with one or more input/output devices 670 to facilitate user interaction. For example, the one or more input/output interfaces 650 can include a display interface, an input interface, or both. For example, the input/output interface 650 is adapted to receive input from a user, to receive input from another computing device, or a combination thereof. In some implementations, the input/output interface 650 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 670 includes one or more user interface devices and displays, including some combination of buttons, keyboards, pointing devices, displays, speakers, microphones, touch screens, and other devices. In a particular aspect, the input/output device 670 includes the display device 120 of FIG. 1.

The processor(s) 620 are configured to communicate with devices or controllers 680 via the one or more communications interfaces 660. For example, the one or more communications interfaces 660 can include a network interface, such as the interface 134 of FIG. 1. The devices or controllers 680 can include, for example, the aircraft 104 of FIG. 1, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-6. In some implementations, part or all of one or more of the operations or methods of FIGS. 1-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of testing, the method comprising:
    obtaining, at a device, a first test matrix for a first aircraft system and a second test matrix for a second aircraft system;
    during a first operational test of the first test matrix, obtaining sensor data that comprises first sensor data in a range specified by the first test matrix and second sensor data that is not specified by the first test matrix;
    evaluating, at the device, the first operational test by processing the first sensor data using a first analytic model of the first aircraft system;
    generating, at the device, first predicted sensor data based on the evaluation of the first operational test;
    evaluating, at the device, a second operational test of the second test matrix by processing the second sensor data using a second analytic model of the second aircraft system;
    generating, at the device, second predicted sensor data based on the evaluation of the second operational test;
    generating, at the device, a first error measure by comparing a first subset of the sensor data to the first predicted sensor data;
    generating, at the device, a second error measure by comparing a second subset of the sensor data to the second predicted sensor data;
    determining, based at least in part on a range of the second sensor data, a test coverage metric of the second test matrix; and
    providing an output to a display device, the output indicating the first error measure, the second error measure, and the test coverage metric.

2. The method of claim 1, wherein the first operational test comprises at least one of a ground test, a taxi test, or a flight test.

3. The method of claim 1, wherein the first analytic model comprises a physics model, an empirical model, a statistical model, a simulation model, or a combination thereof.

4. The method of claim 1, further comprising:
    determining that the second test matrix indicates a first range of data of a first sensor; and
    in response to determining that a second range of data from the first sensor has been processed using the second analytic model during a data collection period, determining the test coverage metric based at least in part on a third range of data that is included in the first range of data and is not included in the second range of data, wherein the range of the second sensor data includes the second range of data from the first sensor.

5. The method of claim 1, further comprising determining, based at least in part on the second error measure, a test convergence metric of the second test matrix, wherein the output indicates the test convergence metric.

6. The method of claim 1, further comprising:
    receiving sets of sensor data during a data collection period, wherein the sets of sensor data comprise the sensor data;
    evaluating a plurality of second operational tests of the second test matrix based on the second analytic model and the sets of sensor data, wherein the plurality of second operational tests comprises the second operational test;
    determining a plurality of second error measures based on the evaluations of the plurality of second operational tests, wherein the plurality of second error measures comprises the second error measure; and
    determining a test convergence metric of the second test matrix based on the plurality of second error measures.

7. The method of claim 6, wherein the test convergence metric is based at least in part on a standard deviation of the plurality of second error measures.

8. The method of claim 1, further comprising, in response to determining that the test coverage metric satisfies a coverage criterion and that a test convergence metric of the second test matrix satisfies a convergence criterion, generating the output to indicate that testing of the second analytic model is complete.

9. The method of claim 1, further comprising, in response to determining that the second error measure fails to satisfy an error criterion, generating the output to indicate that an error is detected in the second analytic model, the second aircraft system, or both.

10. An aircraft comprising:
    aircraft systems comprising a first aircraft system and a second aircraft system;
    memory configured to store a plurality of analytic models of the aircraft systems, the plurality of analytic models comprising a first analytic model of the first aircraft system and a second analytic model of the second aircraft system;
    sensors configured to generate sensor data during a first operational test of a first test matrix of the first aircraft system, wherein the sensor data comprises first sensor data in a range specified by the first test matrix and second sensor data that is not specified by the first test matrix;
    one or more processors configured to:
        evaluate the first operational test by processing the first sensor data using the first analytic model;
        generate first predicted sensor data based on the evaluation of the first operational test;
        evaluate a second operational test of a second test matrix of the second aircraft system by processing the second sensor data using the second analytic model;
        generate second predicted sensor data based on the evaluation of the second operational test;
        generate a first error measure by comparing a first subset of the sensor data to the first predicted sensor data;
        generate a second error measure by comparing a second subset of the sensor data to the second predicted sensor data; and
        determine, based at least in part on a range of the second sensor data, a test coverage metric of the second test matrix; and a display device configured to display an output indicating the first error measure, the second error measure, and the test coverage metric.

11. The aircraft of claim 10, wherein the sensors comprise on-board sensors, flight-test sensors, or a combination thereof.

12. The aircraft of claim 10, wherein the second analytic model comprises a physics model, an empirical model, a statistical model, a simulation model, or a combination thereof.

13. The aircraft of claim 10, wherein the one or more processors are further configured to, in response to determining that the test coverage metric satisfies a coverage criterion and that a test convergence metric of the second test matrix satisfies a convergence criterion, generate the output to indicate that testing of the second analytic model is complete.

14. The aircraft of claim 10, wherein the one or more processors are further configured to, in response to determining that the second error measure fails to satisfy an error criterion, generate the output to indicate that an error is detected in the second analytic model, the second aircraft system, or both.

15. A computer-readable storage device storing instructions that, when executed by one or more processors, cause the one or more processors to:
    obtain a first test matrix for a first aircraft system and a second test matrix for a second aircraft system;
    during a first operational test of the first test matrix, obtain sensor data that comprises first sensor data in a range specified by the first test matrix and second sensor data that is not specified by the first test matrix;
    evaluate the first operational test by processing the first sensor data using a first analytic model of the first aircraft system;
    generate first predicted sensor data based on the evaluation of the first operational test;
    evaluate a second operational test of the second test matrix by processing the second sensor data using a second analytic model of the second aircraft system;
    generate second predicted sensor data based on the evaluation of the second operational test;
    generate a first error measure by comparing a first subset of the sensor data to the first predicted sensor data;
    generate a second error measure by comparing a second subset of the sensor data to the second predicted sensor data;
    determine, based at least in part on a range of the second sensor data, a test coverage metric of the second test matrix; and
    provide an output to a display device, the output indicating the first error measure, the second error measure, and the test coverage metric.

16. The computer-readable storage device of claim 15, wherein each of the first operational test and the second operational test comprises at least one of a ground test, a taxi test, or a flight test.

17. The computer-readable storage device of claim 15, wherein the instructions further cause the one or more processors to:
    determine that the second test matrix indicates a first range of data of a first sensor; and
    in response to determining that a second range of data from the first sensor has been processed using the second analytic model during a data collection period, determine the test coverage metric based at least in part on a third range of data that is included in the first range of data and is not included in the second range of data, wherein the range of the second sensor data includes the second range of data from the first sensor.

18. The computer-readable storage device of claim 15, wherein the instructions further cause the one or more processors to:
    obtain sets of sensor data during a data collection period, wherein the sets of sensor data comprise the sensor data;
    evaluate a plurality of second operational tests of the second test matrix based on the second analytic model and the sets of sensor data, wherein the plurality of second operational tests comprises the second operational test;
    determine a plurality of second error measures based on the evaluation of the plurality of second operational tests, wherein the plurality of second error measures comprises the second error measure; and
    determine a test convergence metric of the second test matrix based on the plurality of second error measures.

19. The computer-readable storage device of claim 15, wherein the instructions further cause the one or more processors to, in response to determining that the test coverage metric satisfies a coverage criterion and that a test convergence metric of the second test matrix satisfies a convergence criterion, generate the output to indicate that testing of the second analytic model is complete.

20. The computer-readable storage device of claim 15, wherein the instructions further cause the one or more processors to, in response to determining that the second error measure fails to satisfy an error criterion, generate the output to indicate that an error is detected in the second analytic model, the second aircraft system, or both.

* * * * *